(12) United States Patent
Becker

(10) Patent No.: US 8,605,209 B2
(45) Date of Patent: Dec. 10, 2013

(54) HURRICANE DAMAGE RECORDING CAMERA SYSTEM

(76) Inventor: Gregory Towle Becker, Katy, TX (US)

( * ) Notice: Subject to any disclaimer, the term of this patent is extended or adjusted under 35 U.S.C. 154(b) by 421 days.

(21) Appl. No.: 12/953,844

(22) Filed: Nov. 24, 2010

(65) Prior Publication Data

US 2011/0122240 A1    May 26, 2011

Related U.S. Application Data

(60) Provisional application No. 61/264,183, filed on Nov. 24, 2009.

(51) Int. Cl.
*H04N 5/225* (2006.01)

(52) U.S. Cl.
USPC ........................................................ 348/374

(58) Field of Classification Search
USPC ........................................................ 348/374
See application file for complete search history.

(56) References Cited

U.S. PATENT DOCUMENTS

| | | | |
|---|---|---|---|
| 6,163,338 A | 12/2000 | Johnson et al. |
| 6,424,370 B1 | 7/2002 | Courtney |
| 6,542,183 B1 | 4/2003 | DeAngelis et al. |
| 6,628,835 B1 | 9/2003 | Brill et al. |
| 6,721,454 B1 | 4/2004 | Qian et al. |
| 6,839,080 B2 | 1/2005 | Meyers |
| 7,283,723 B2 | 10/2007 | Wilson et al. |
| 7,302,323 B2 | 11/2007 | Anderson et al. |
| 7,348,895 B2 | 3/2008 | Lagassey |
| 7,536,457 B2 | 5/2009 | Miller |
| 7,606,425 B2 | 10/2009 | Bazakos et al. |
| 7,619,660 B2 | 11/2009 | Grosvenor et al. |
| 7,640,083 B2 | 12/2009 | Monroe |
| 7,646,914 B2 | 1/2010 | Clausi et al. |
| 7,735,737 B2 | 6/2010 | Kotlarsky et al. |
| 2002/0035522 A1 | 3/2002 | Pilcher |
| 2002/0054223 A1 | 5/2002 | Spriggs |
| 2004/0095506 A1* | 5/2004 | Scott .............................. 348/373 |
| 2005/0122397 A1 | 6/2005 | Henson et al. |
| 2005/0251427 A1 | 11/2005 | Dorai et al. |
| 2005/0283438 A1 | 12/2005 | Brownewell et al. |
| 2005/0286860 A1 | 12/2005 | Conklin |
| 2006/0093205 A1 | 5/2006 | Bryll et al. |
| 2006/0178902 A1 | 8/2006 | Vicars et al. |

(Continued)

OTHER PUBLICATIONS

"Witness to destruction—hurricane camera may save money" SunHerald.com, Anita Lee, Jul. 5, 2007.

(Continued)

*Primary Examiner* — Richard Torrente
(74) *Attorney, Agent, or Firm* — Plager Schack, LLP

(57) ABSTRACT

A storm damage monitoring system, including: a low-lux video camera, a digital video recording device, and a power storage container, disposed on a guided slide. Further included is a sealable housing that includes an optical window on one side and a sealing cap disposable on an opposite side, the sealing cap removable to receive the guided slide inside the housing. The optical window and the camera are positioned and arranged for the camera to capture images through the optical window when the guided slide is received by the housing. Further included is a mounting plate, a first and a second anchoring strap, a first and a second U-bolt for securing the sealable housing to the mounting plate, a stabilizer chain, and a location tracking device disposed in the housing. The camera and digital video recording device are configured to run autonomously upon sealing inside the housing.

10 Claims, 6 Drawing Sheets

(56) References Cited

U.S. PATENT DOCUMENTS

| | | | |
|---|---|---|---|
| 2006/0215023 | A1 | 9/2006 | Coonce et al. |
| 2007/0124042 | A1 | 5/2007 | Monroe |
| 2007/0136076 | A1 | 6/2007 | Goldberg et al. |
| 2007/0138275 | A1* | 6/2007 | Hall .............................. 235/400 |
| 2007/0187510 | A1 | 8/2007 | Kotlarsky et al. |
| 2007/0268368 | A1 | 11/2007 | Bradford |
| 2008/0033847 | A1 | 2/2008 | McIntosh |
| 2008/0129828 | A1 | 6/2008 | Luithlen |
| 2009/0106362 | A1 | 4/2009 | Kuhlke et al. |
| 2009/0187953 | A1 | 7/2009 | Onoe |
| 2010/0066899 | A1* | 3/2010 | Holmberg .................... 348/372 |

OTHER PUBLICATIONS http://www.gregledet.net/hurricam/hurricam.html, extracted Aug. 10, 2010.

http://search.gandermountain.com/?Ne=1000&N=1255&cname=Game-Cameras, © 2003-2010, extracted Aug. 10, 2010.

http://www.gandermountain.com/modperl/product/details.cgi?i=427744&pdesc=Moultrie_Game_Spy_D551R_Game_Camera&aID=503B1A&merchID=4006, Gandermountain.com © 2003-2010, extracted Aug. 10, 2010.

http://www.seaviewer.com/underwater_video_cameras_equipment.html, Gandermountain.com © 2007, extracted Aug. 10, 2010.

http://www.dvcco.com/wp-content/pdfs/datasheets/DVC-2000C_Color_Datasheet.pdf, DVC Company Jun. 2007, extracted Aug. 10, 2010.

http://www.amazon.com/Snake-Mate-Tethered-Underwater-Waterproof/dp/B00470GAEY/ref=sr_1_6?ie=UTF8&qid=1295478322&sr=8-6, Amazon.com © 1996-2011, extracted Aug. 10, 2010.

http://www.rosys.com/products/cameras/inspector.htm, Remote Ocean Systems, San diego, CA, extracted Aug. 10, 2010.

http://hurri-cam.com/, Rain Deflection/Cameria Protection System, extracted Aug. 10, 2010.

* cited by examiner

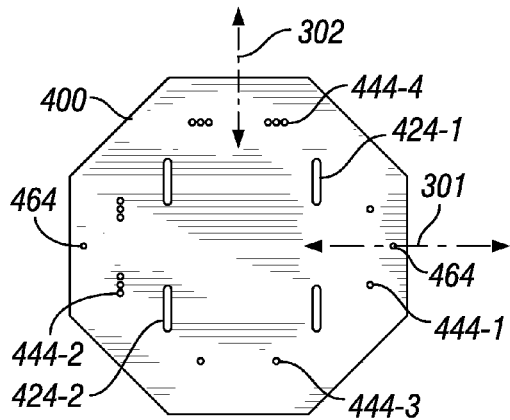
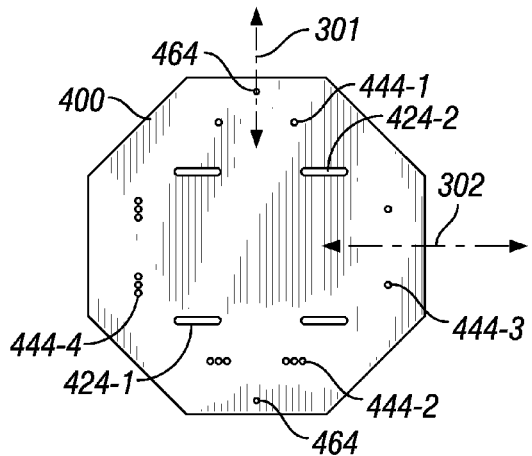
FIG. 4A  FIG. 4B
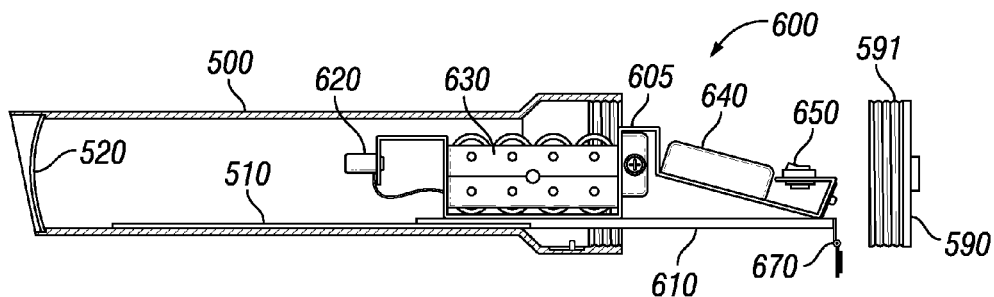
FIG. 5A
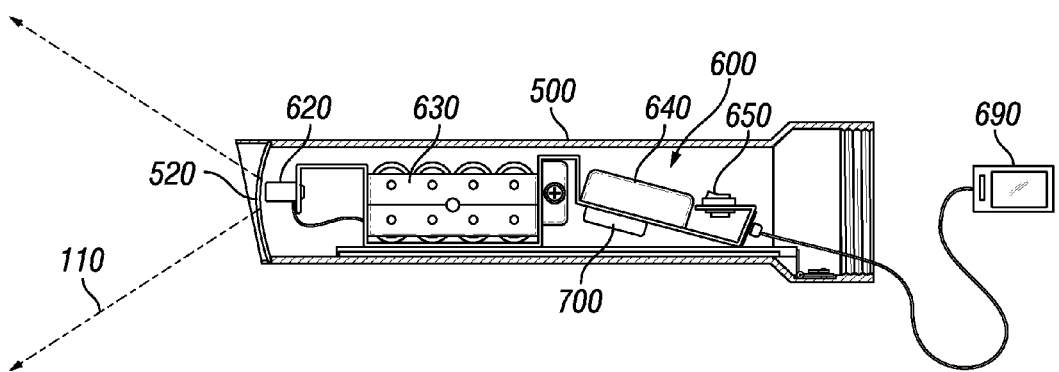
FIG. 5B ium. Disputes must be resolved using post-storm evidence as well as experts and modeling. Such "after the fact" data, expert opinions, and modeling are currently unreliable.

HURRICANE DAMAGE RECORDING CAMERA SYSTEM

STATEMENT OF RELATED CASES

This application claims the benefit of U.S. Provisional Application No. 61/264,183 of filing date Nov. 24, 2009.

FIELD OF THE INVENTION

This invention relates to a system for recording damage sequence and damage cause to properties during and after severe weather and hurricanes, including damage or loss caused by vandalism or looting.

BACKGROUND

Severe storm and hurricane damage causes and sequence of destruction are continually disputed by various entities, including insurance companies and law firms. Reliable analysis of wind versus flood damage sequence in shore homes is not possible, resulting in insurance claim disputes. For example, insurance recovery for damage to a structure caused first by wind, and then by wave is typically treated differently from damage to a structure caused first by wave and then by wind. Determining how much damage was caused by wind versus by wave, as well as the sequence of events, is the subject of many disputes with uncertain outcomes. Further, the post-storm evidence is complicated by damage or loss caused by post storm events, such as looting and/or vandalism. Disputes must be resolved using post-storm evidence as well as experts and modeling. Such "after the fact" data, expert opinions, and modeling are currently unreliable.

Applicant has discovered a need for a creating real-time data throughout and after a severe weather event. If possible to safely collect such data, then the data would serve to prove damage causation and the sequence of destruction. Applicant discovered that it is not obvious how to accomplish this. For example, simply placing a camera in a weatherproof casing does not reliably solve the problem. The target structures to be monitored are apt to be destroyed by the weather event. This means that any structure supporting a camera device will be under similar environmental conditions and is also apt to be destroyed. Further, severe weather events are unpredictable in time and geography. There is limited choice in structure for supporting a camera—as there is little time to build a structure once a particular target structure is determined to be in the path of a severe weather event. Choices are generally limited to other existing structures. This means that the solution requires a way to easily adapt a camera mount to secure to an arbitrary existing structure, while also enabling the camera to withstand through an otherwise catastrophic severe weather event. Given that the structure holding such a camera is apt to also be scattered and/or destroyed, such a camera system must also be able to survive and be recoverable. Another problem is that many cameras supplement ambient lighting conditions by casting infra-red light for enhancement and/or focusing. Under severe weather conditions, this active enhancement fails due to reflections off rain and/or off the sight through a protective housing. Further, wired and wireless communication systems, and grid-based power systems, are likely to be unavailable or useless within and during the severe weather event. This presents the additional complication that such a camera system must be able to operate independently of power grids and communication networks. Up to two or three days of power may be required. This causes a cascading problem in that such a camera system must be able to "stay on target", that is, to continue its aim on the target structure throughout the severe weather event, in spite of wind and vibrations caused by the severe weather event. The system must exhibit a level of robustness under various aerodynamic conditions while incorporating structural components to addresses these competing functional requirements. Additionally, surge and floodwater could cause damage such a system if not made waterproof. It becomes less and less obvious how to structure an independently powered camera system that can meet all these requirements (independence, aim, recovery, vibration, power, weatherproof, waterproof, data capture, survivability, ability to secure to an arbitrary existing structure, sensitivity under ambient light conditions, etc) under the wind and rain load conditions of a severe weather event, especially in a hurricane.

Applicant further discovered that securely mounting a camera to an arbitrary existing structure creates a problem in aiming the camera at the target structure that is to be monitored. Positive and actual verification that the camera is capturing images of the target structure, and is not mis-aimed, requires some sort of verification after the system is secured to the supporting structure, but without imparing the wind-load footprint, without impairing the power usage, and without disrupting the secured aim.

Underwater cameras in housings are known. These devices, while waterproof, are typically aimed at objects in real time and do not have to run autonomously fixed on a structure that is potentially undergoing destruction. These devices, further, are not subject to the destructive forces of a landfall weather event and exist in many examples with external powering and cabling.

Wildlife cameras that run autonomously are known. These devices, while self-powered and self-contained, are in many cases not designed for continuous image capture over long periods of time and are not designed to run autonomously fixed on a structure that is potentially undergoing destruction. These devices are designed to remotely activate from movement and include infra-red light enhancement, both of which prevent proper operation to capture storm damage. These devices, further, are not subject to the destructive forces of a landfall weather event. The problem with remote monitoring devices is that they are not hurricane proof and they are not intended for such use.

SUMMARY

In one example, a device that remotely records damage sequence and damage cause to properties during and after severe weather and hurricanes. This may include vandalism.

In a set of examples, a storm damage monitoring system is disclosed, the monitoring system including: a guided slide having means for carrying components; a low-lux video camera disposed on the guided slide; a digital video recording device disposed on the guided slide and connected to the video camera, having capacity to record digital images from the camera at a frame rate of at least one frame per second and having capacity to store at least two days accumulation of the recorded digital images when recorded at a frame rate of two frames per second; a power storage container disposed on the guided slide and in electrical supply communication with the camera and the digital video recording device, physically dimensioned for holding a power storage member having capacity to provide power to the camera and the digital video recording device sufficient to capture and store at least two days accumulation of the recorded digital images when recorded at a frame rate of two frames per second; a sealable housing having a means for positioning and locking the guided slide inside the housing; an optical window on one side of the housing; a sealing cap disposable on an opposite side of the housing, the sealing cap removable to receive the guided slide inside the housing; where the optical window and the camera are positioned and arranged for the camera to capture images through the optical window when the guided slide is received by the internal mount; means for aiming the camera, the aiming means including: a video output outlet disposed in the housing, the video output outlet in video communication with the digital video recording device, positioned and arranged to connect to a detachable monitor screen when the sealing cap is detached from the housing and the guided slide is received by the internal mount; and a detachable monitor screen external to the housing, removably connectable to the video output outlet when the sealing cap is detached from the housing and the guided slide is received by the internal mount; a mounting plate; a first pair of first receptacle orifices disposed on the mounting plate positioned and arranged to receive a first anchoring strap, the first pair of first receptacle orifices positioned laterally on one side of a first axis of the mounting plate; a second pair of first receptacle orifices disposed on the mounting plate positioned and arranged to receive a second anchoring strap, the second pair of first receptacle orifices positioned laterally on the side of the first axis of the first mounting plate opposing the first pair of first receptacle orifices; a first and a second anchoring strap each arranged and configured for receiving by either the first pair or by the second pair of first receptacle orifices; a first pair of second receptacle orifices disposed on the mounting plate positioned and arranged to receive a first U-bolt for securing the housing to the mounting plate, the first pair of second receptacle orifices positioned laterally on one side of the second axis of the mounting plate; a plurality of second pairs of second receptacle orifices disposed on the mounting plate positioned and arranged to receive a second U-bolt for securing the housing to the mounting plate, the plurality of second pairs of second receptacle orifices positioned laterally on the side of the second axis of the mounting plate opposing the first pair of second receptacle orifices; a third pair of second receptacle orifices disposed on the mounting plate positioned and arranged to receive a first U-bolt for securing the housing to the mounting plate, the third pair of second receptacle orifices positioned laterally on one side of a first axis of the mounting plate, the second axis opposing the first axis of the mounting plate; a plurality of fourth pairs of second receptacle orifices disposed on the mounting plate positioned and arranged to receive a second U-bolt for securing the housing to the mounting plate, the plurality of fourth pairs of second receptacle orifices positioned laterally on the side of the first axis of the mounting plate opposing the third pair of second receptacle orifices; a first and a second U-bolt for securing the sealable housing to the mounting plate, each of first and second U-bolt arranged and configured for receiving by either the first pair or by one of the plurality of second pairs of second receptacle orifices or by either the third pair or by one of the plurality of fourth pairs of second receptacle orifices; a pair of third receptacle orifices disposed on the first axis of the mounting plate positioned and arranged to receive a stabilizer chain; a stabilizer chain arranged and configured for receiving by the pair of third receptacle orifices, one end of the chain bolted to the mounting plate at a first of the pair of the third receptacle orifices and the other end of the chain mounted to one end of a tensioner wherein the other end of the tensioner is attachable to the second of the pair of third receptacle orifices; and a location tracking device disposed in the housing; and wherein the camera and digital video recording device are configured to run autonomously upon sealing inside the housing.

In another example, the camera of the monitoring system includes a fixed-focused lens or locking-adjustable-focus lens.

In another example, the camera of the monitoring system includes a low-lux video camera without infrared enhancement.

In another example, the camera of the monitoring system includes a combination of a low-lux camera and a night-vision camera without infrared enhancement. The night-vision camera provides images when the light level is too low for the low-lux camera.

In another example, the camera of the monitoring system is non-motion sensing.

In another example, the power storage container of the monitoring system is physically dimensioned to contain eight batteries selected from the group consisting of: US ANSI Standard C18.1 type 13 batteries, type D batteries, rechargeable US ANSI Standard C18.1 type 13 batteries, and rechargeable type D batteries.

In another example, the location tracking device of the monitoring system is powered by a second power storage member that is independent from the power storage container.

In another example, the means for positioning and locking includes an internal mount for preventing rotation of the guided slide member and for preventing longitudinal movement of the guided slide member.

In another example, the means for positioning and locking includes a track preventing rotation of the guided slide member and a fastening member for preventing longitudinal movement of the guided slide member.

In another example, the means for positioning and locking includes a stop member configured to receive the guided slide member.

BRIEF DESCRIPTION OF THE DRAWINGS

The present invention is best understood with reference to the attached drawings in which like numerals refer to like elements, and in which:

FIG. 4A illustrates a front view of an example of the mounting plate oriented for disposing on a vertical pole;

FIG. 4B illustrates a front view of an example of the mounting plate oriented for disposing on a horizontal pole;

FIG. 5A illustrates a schematic side view of the camera system housing with camera carriage assembly partially slid out of the housing;

FIG. 5B illustrates a schematic side view of the camera system housing with camera carriage assembly inserted into the housing, with a detachable monitor connected;

DETAILED DESCRIPTION

Reliable Analysis of wind versus flood damage sequence in shore homes is not possible, resulting in insurance claim disputes. One example is a hurricane wind and flood proof camera that accurately records the damage sequence.

Figure 1:
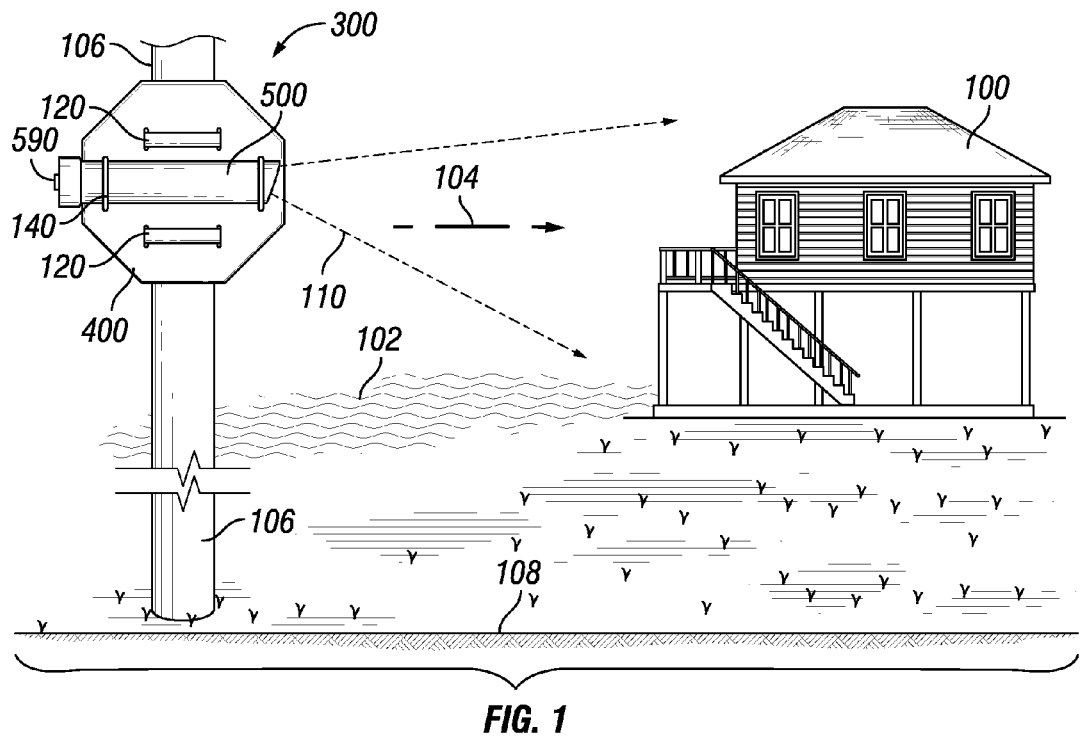
FIG. 1 illustrates a front view of an example of the camera system installed on pole and aimed at a target structure.

FIG. 1 illustrates a front view of an example of the camera system installed on pole and aimed at a target structure. Target structure 100, in this example, is depicted as a beach house overlooking an ocean having waves 102 and subject to wind 104. In this example, a utility pole 106 rises vertically from a grade 108. Utility pole 106 is suitable as a mounting structure for the storm camera system 300. A secure mounting or deployment object that allows clear line of vision to the subject is potentially suitable as a mounting structure. For a given target structure there will be an unknown number and type of mounting structures that may be available for mounting the camera system. A utility pole is one example of a mounting structure. Suitable mounting structures that may exist for a given target structure may include other types of vertical poles or horizontal rails. These potential mounting structures come in a variety of widths and diameters and they may be vertically or they may be horizontally oriented. Applicant has found that the camera system must have a range of widths and diameters, in both vertical and horizontal position, that the camera system is capable of embracing.

In this example, camera system 300 is mounted on vertical mounting structure, utility pole 106. Camera system 300 includes several key components which serve various functions. Each of these components will be detailed further, below. One component is mounting plate 400, which simultaneously serves several functions. Straps 120 affix mounting plate 400 to utility pole 106. Camera housing 500 is affixed to mounting plate 400 by U-bolts 140. In one example, camera system 300 is deployed in the field a short time ahead of occurrence of a severe weather event. This means that a suitable mounting structure is located and camera system 300 adaptively positioned during field deployment. The structural configuration of mounting plate 400 and straps 120 enable camera system 300 to be rotated during field deployment in order to aim at into the line of vision 110 to the target structure 100. Line of vision is critical for insuring that accurate data is gathered in video form regarding the destruction and/or sequence of damage of the property. Wind damage may occur before, during or after surge and wave damage. Damage sequence is critical to flood and wind insurance claim coverage. Cap 590 seals the interior of camera housing 500 from the external environment and serves as a means for accessing the interior camera components and electronics at any time prior to, during, or after positioning and aiming of the camera system 300.

Figure 2:
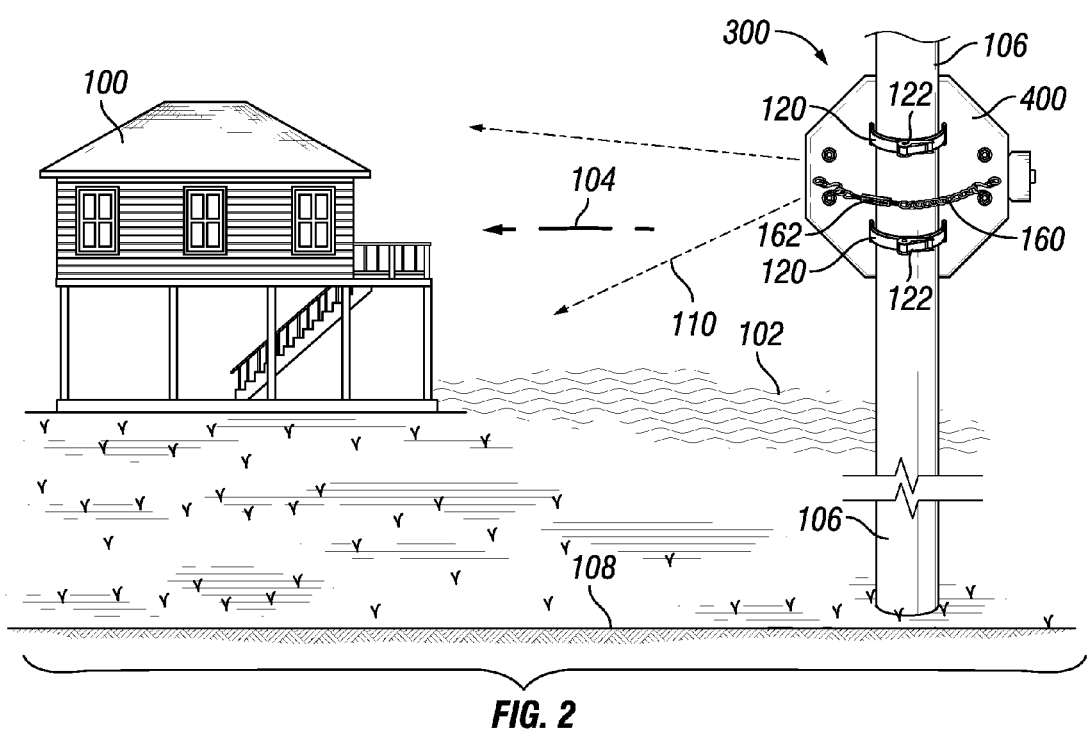
FIG. 2 illustrates a rear view of an example of the camera system installed on pole and aimed at a target structure.

FIG. 2 illustrates a rear view of an example of the camera system installed on pole and aimed at a target structure. In this example, camera system 300 is aimed into line of vision 110 to the target structure 100. Mounting plate 400 embraces utility pole 106 using straps 120. A mounting strap ratchet 122 is disposed on each of straps 120, enabling attachment in-the-field of mounting plate 400 to utility pole 106. Mounting strap ratchets 122 serve to allow rotational freedom of mounting plate 400 during aiming of camera system 300 and also enable strong binding of mounting plate 400 to the mounting structure utility pole 106 to fix the aim of camera system 300 into the line of vision 110 to the target structure 100.

Waves 102 and wind 104 factor greatly in the structural configuration of camera system 300. Wave pressures are tremendous and are estimated at half the height of the surge, and are added to the surge. Wave and surge hydrodynamic forces are additive. Wind pressures are related to the square of the velocity. These forces will act to cause movement and dislodgement of objects in their path. Camera system 300, including its configuration, arrangement, and combination of components, and the resulting binding forces upon its mounting structure, is structurally configured resist movement and dislodgement of the camera system during a severe weather event. Further, the configuration, arrangement, and combination of components resists wind velocities up to at least 130 miles per hour with no disruption of camera video quality. In one example, the camera system 300 has been tested in a certified wind tunnel and proven to be resistant to wind velocities of up to 130 mph with no disruption of camera video quality. Waves 102 and/or wind 104 can cause oscillations in objects subjected to their forces. In one example, wind 104 is variable and causes fluttering of objects in its path. Applicant has found that vibrations are reduced by disposing a stabilizing chain 160, affixed near the opposite ends of the mounting plate 400 and embraced across the mounting structure utility pole 106. In one example, the chain and chain links have a minimum of 1000 lb. safe working load. A tensioner 162 is disposed within the chain. In one example, stabilizing chain tensioner 162 is a three-eighths inch (⅜") stainless steel turnbuckle of hook-and-eye design with a 350 lb total capacity rating. In another example, a small chain tensioner is used.

The secured attachment and camera is wind proof. The mounting plate is aerodynamic and the corners are smoothed to minimize wind and water force. Chain stabilizers are inflexible and prevent flutter. The double strap system secures the camera and it is mountable to vertical or horizontal mounting locations. The system together prevents vibration from winds and any angle that would interfere with camera recording. The camera is waterproof and the whole device floats if dislocated during the surge.

In many examples, mounting locations vary widely and must be located quickly before high winds reach the area. In one example, camera system 300 is mountable on any reliable horizontal or vertical fastening point. In another example, it is also mountable to a "stand alone" mounting pod, as needed. The straps and stabilizer chain can be mounted securely on vertical or horizontal mounting locations. The casing and camera are vertically and horizontally adjustable to allow the subject structure to be brought into the field of view independently of the fastening point.

Figure 3A:
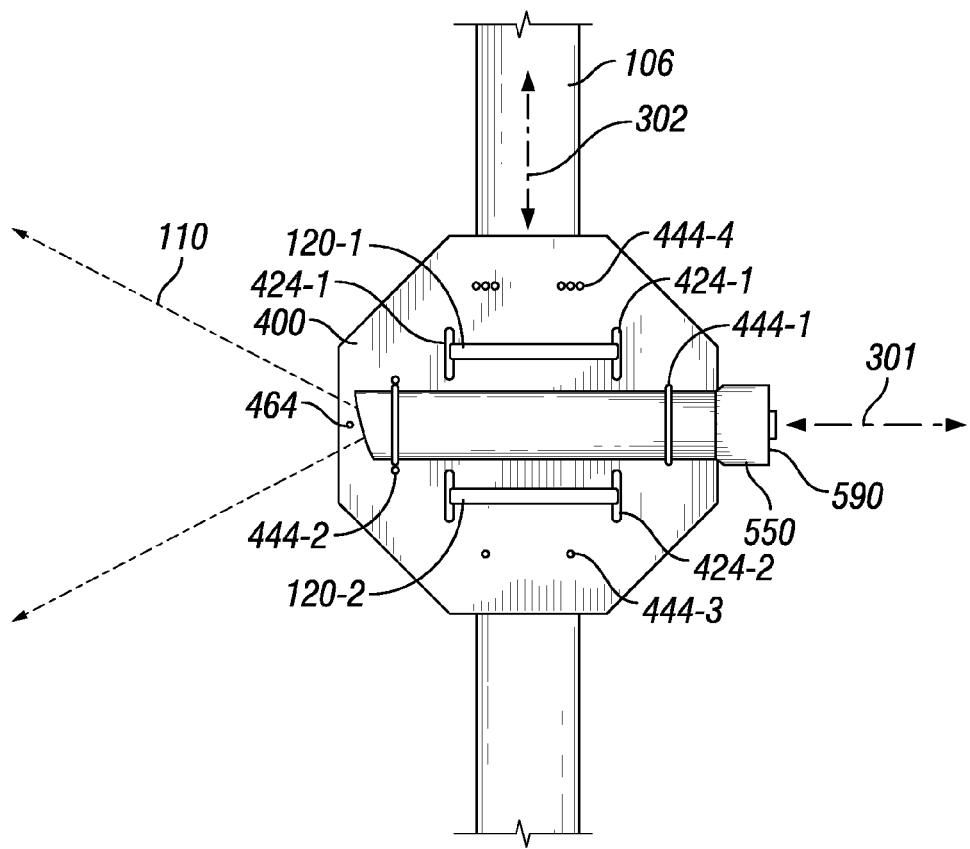
FIG. 3A illustrates a front view of an example of the camera system installed on vertical pole.

FIG. 3A illustrates a front view of an example of the camera system installed on vertical pole. FIG. 4A illustrates a front view of an example of the mounting plate oriented for disposing on a vertical pole. Prior to field deployment, it is not known whether a horizontal or a vertical mounting structure will be suitable for receiving camera system 300. In that regard, camera system 300 uses a pre-configured mounting plate 400 for easy and quick field deployment that is also secure and in either vertical or horizontal orientation. This is accomplished by positioning and arrangement of orifices in mounting plate 400 for receiving the various straps, chains, and bolts. In one example, a vertical mounting structure utility pole 106 is shown with camera system 300 deployed in the horizontal direction, with line of vision 110 pointing to the left.

Mounting plate 400 is defined to have a first axis 301 and a second axis 302. In this example, first axis 301 is in the horizontal direction. In this example, second axis 302 is in the vertical direction, parallel to the longitudinal vertical direction of utility pole 106. These axes are used to describe the relative orientations of the orifices on the mounting plate that enable the mounting plate to be field-deployable unto either horizontal or vertical mounting structures.

A first pair of first receptacle orifices 424-1 is disposed on mounting plate 400 on one side of the first axis 301 of mounting plate 400. In the illustrated example, first pair of first receptacle orifices 424-1 is a pair of vertical slits, the longitudinal direction of the slits parallel to the orientation of second axis 302, the pair disposed above first axis 301, with one of the pair of slits disposed to the left of vertical axis 302 and the other one of the pair of slits disposed to the right of vertical axis 302. First pair of first receptacle orifices 424-1 is positioned and arranged to receive a first anchoring strap 120-1, the first pair of first receptacle orifices 424-1 positioned laterally on one side of first axis 301 of the mounting plate 400.

A second pair of first receptacle orifices 424-2 is disposed on mounting plate 400 on the other side of first axis 301 of mounting plate 400. In the illustrated example, second pair of first receptacle orifices 424-2 is a pair of vertical slits, the longitudinal direction of the slits parallel to the orientation of second axis 302, the pair disposed below first axis 301, with one of the pair of slits disposed to the left of vertical second axis 302 and the other one of the pair of slits disposed to the right of vertical second axis 302. Second pair of first receptacle orifices 424-2 is positioned and arranged to receive a second anchoring strap 120-2, the second pair of first receptacle orifices 424-2 positioned laterally on one side of first axis 301 of the mounting plate 400, opposing the first pair of first receptacle orifices.

The positioning and arrangement of the first and the second pairs of receptacle orifices on mounting plate 400 enables straps 120-1 and 120-2 to embrace around vertical pole 160. First anchoring strap 120-1 and second anchoring strap 120-2 are each arranged and configured for receiving by either the first pair of first receptacle orifices 424-1 or by the second pair of first receptacle orifices 424-2.

A first pair of second receptacle orifices 444-1 is disposed on mounting plate 400 on one side of the second axis 302 of mounting plate 400. In the illustrated example, first pair of second receptacle orifices 444-1 is a pair of round bolt holes disposed to the right of vertical second axis 302, the holes aligned parallel to the longitudinal direction of second axis 302, one hole disposed above first axis 301 and one hole disposed below first axis 301. First pair of second receptacle orifices 444-1 is positioned and arranged to receive a first U-bolt 140-1 for securing the housing 500 to mounting plate 400, the first pair of second receptacle orifices 444-1 positioned laterally on one side of second axis 302 of the mounting plate 400.

A plurality of second pairs of second receptacle orifices 444-2 are disposed on mounting plate 400 on the other side of the second axis 302 of mounting plate 400. In the illustrated example, the plurality of second pairs of second receptacle orifices 444-2 are three pairs of round bolt holes disposed to the left of vertical second axis 302, the holes aligned parallel to the longitudinal direction of second axis 302, one hole of each of the plurality of pairs disposed above first axis 301 and one hole of each of the plurality of pairs disposed below first axis 301. The plurality of second pairs of second receptacle orifices 444-2 are positioned and arranged to receive a second U-bolt 140-2 for securing the housing 500 to the mounting plate 400, the plurality of second pairs of second receptacle orifices 444-2 positioned laterally on the side of second axis 302 of the mounting plate 400 that is opposing the first pair of second receptacle orifices 444-1.

The plurality of second pairs of second receptacle orifices 444-2 enables in-the-field vertical adjustment of camera housing 500 in order to aim the line of vision 110 to the target structure 100.

A pair of third receptacle orifices 464 is disposed along the first axis 301 of mounting plate 400. In the illustrated example, each orifice of the pair of third receptacle orifices 464 is disposed on opposite ends of mounting plate 400 and are bolt holes for securing the ends of stabilizer chain 160 (FIG. 2) to mounting plate 400. In one example, the pair of third receptacle orifices is disposed transversely across the second axis of the mounting plate, a first orifice of the pair of third receptacle orifices disposed on one side of the second axis of the mounting plate and a second orifice of the pair of third receptacle orifices disposed on the other side of the second axis of the mounting plate. The pair of third receptacle orifices 464 is positioned and arranged to receive the stabilizer chain.

The orifices are advanced through the mounting plate for securing the anchoring straps to mount on a vertical or horizontal secure location.

Thus, mounting plate 400 and camera housing 500 become a wind proof and surge proof adjustable mounting mechanism that allows fixed attachment to a secure location while providing for adjustment of the field of view.

In one example, mounting plate 400 further comprises a distribution of vent holes. In a particular example, wind tunnel tests were conducted on a mounting plate without vent holes. Absence of vent holes reduced the complexity of the wind tunnel test. The mounting plate was comprised of two sheets of three-quarter inch (¾") plywood that is bonded together to form a one and one-half inch (1.5") thick sheet. The plywood was cut into the shape of a regular octagon shape, eighteen inches (18") wide. The edges were routed to a one-half inch (½") round over and all surfaces sanded to reduce wind resistance. Satisfactory wind load and video image quality were obtained without vibration.

In one example, camera housing 550 has a widened diameter on the cap-end of the housing. In one example, camera housing 550 maintains a substantially constant diameter along the length of the housing.

Figure 3B:
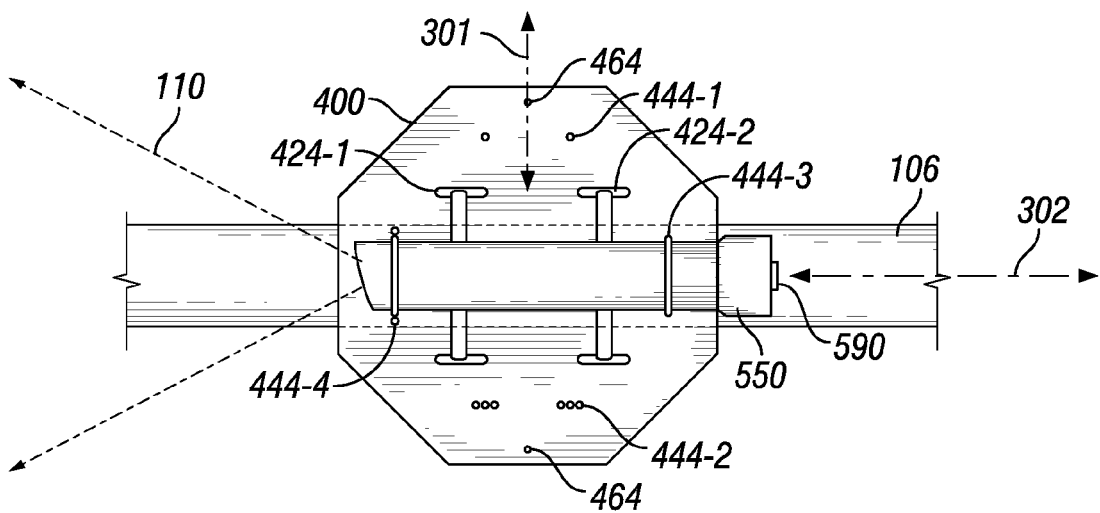
FIG. 3B illustrates a front view of an example of the camera system installed on horizontal pole.

FIG. 3B illustrates a front view of an example of the camera system installed on horizontal pole. FIG. 4B illustrates a front view of an example of the mounting plate oriented for disposing on a horizontal pole. In one example, a horizontal mounting structure pole 106 is shown with camera system 300 deployed in the horizontal direction, with line of vision 110 pointing to the left. In this example, first axis 301 is in the vertical direction. In this example, second axis 302 is in the horizontal direction, parallel to the longitudinal horizontal direction of pole 106. These axes are used to describe the relative orientations of the orifices on the mounting plate that enable the mounting plate to be field-deployable unto either horizontal or vertical mounting structures.

In this orientation, first pair of first receptacle orifices 424-1 remains disposed on mounting plate 400 as shown in FIG. 3A and FIG. 4A and therefore appears disposed on the left side of the first axis 301 of mounting plate 400. In the illustrated example, first pair of first receptacle orifices 424-1 is a pair of vertical slits, the longitudinal direction of the slits parallel to the orientation of second axis 302, the pair disposed to the left of first axis 301, with one of the pair of slits disposed below horizontal second axis 302 and the other one of the pair of slits disposed above horizontal second axis 302. First pair of first receptacle orifices 424-1 is positioned and arranged to receive a first anchoring strap 120-1 to embrace horizontal pole 106.

In this orientation, second pair of first receptacle orifices 424-2 remains disposed on mounting plate 400 as shown in FIG. 3A and FIG. 4A and therefore appears disposed on the right side of first axis 301 of mounting plate 400. In the illustrated example, second pair of first receptacle orifices 424-2 is a pair of vertical slits, the longitudinal direction of the slits parallel to the orientation of second axis 302, the pair disposed to the right of first axis 301, with one of the pair of slits disposed below horizontal second axis 302 and the other one of the pair of slits disposed to above horizontal second axis 302. Second pair of first receptacle orifices 424-2 is positioned and arranged to receive a second anchoring strap 120-2 to embrace horizontal pole 106.

A third pair of second receptacle orifices 444-3 is disposed on mounting plate 400 on one side of the first axis 301 of mounting plate 400. In the illustrated example, third pair of second receptacle orifices 444-3 is a pair of round bolt holes disposed to the right of vertical first axis 301, the holes aligned parallel to the longitudinal direction of first axis 301, one hole disposed above second axis 302 and one hole disposed below second axis 302. Third pair of second receptacle orifices 444-3 is positioned and arranged to receive a first U-bolt 140-1 for securing the housing 500 to mounting plate 400, the third pair of second receptacle orifices 444-3 positioned laterally on one side of first axis 301 of the mounting plate 400. In one example, the first axis 301 and the second axis 302 oppose each other in that the two axes intersect at a location on mounting plate 400.

A plurality of fourth pairs of second receptacle orifices 444-4 are disposed on mounting plate 400 on the other side of the first axis 301 of mounting plate 400. In the illustrated example, the plurality of fourth pairs of second receptacle orifices 444-4 are three pairs of round bolt holes disposed to the left of vertical second first axis 301, the holes aligned parallel to the longitudinal direction of first axis 301, one hole of each of the plurality of pairs disposed above second axis 302 and one hole of each of the plurality of pairs disposed below second axis 302. The plurality of second pairs of fourth receptacle orifices 444-4 are positioned and arranged to receive a second U-bolt 140-2 for securing the housing 500 to the mounting plate 400, the plurality of fourth pairs of second receptacle orifices 444-4 positioned laterally on the side of first axis 301 of the mounting plate 400 that is opposing the third pair of second receptacle orifices 444-3.

One surprising result of this structural configuration for mounting plate 400 is that a second pair of third receptacle orifices for the stabilizer chain is not needed in order to deploy the camera system 300 on a horizontal mounting structure.

As shown in FIG. 4A and FIG. 4B, in one example mounting plate 400 has a shape of a regular octagon. Mounting plate 400 provides a means for recovery of camera system 300 in the event the mounting structure is destroyed during the severe weather event. In one example, mounting plate 400 provides a means for making camera system 300 buoyant. In a particular example, mounting plate 400 is comprised of two sheets of three-quarter inch (¾") plywood that is bonded together to form a one and one-half inch (1.5") thick sheet. In one example, the plywood is cut into the shape of a regular octagon shape that is eighteen inches (18") wide. The edges are routed to a one-half inch (½") round over and all surfaces are sanded to reduce wind resistance. Mounting plate 400 further provides a means for stabilizing and plat-forming the camera from movement from winds and vibrations during a severe weather event. The edges and octagon configuration of mounting plate 400 has resulted in stable performance of the camera system 300 at 130 mph wind tunnel testing. Further, overall wind load of the plate and vibration are reduced. In one preferred example, the structural size and configuration of mounting plate 400 results in a net buoyancy of between four and five pounds (4-5 lbs) in addition to the net buoyancy of the closed camera housing 500.

In one example, the mounting plate is sufficiently structurally rigid to have strength to maintain at least three holes of one-half inch diameter each, spaced one-quarter inch apart from each other. In one example, the plurality of second pairs of second receptacle orifices 444-2 and the plurality of second pairs of fourth receptacle orifices 444-4 are each pairs of at least three holes of one-half inch diameter each, spaced one-quarter inch apart.

In one example, mounting plate 400 is sufficiently structurally rigid to withstand stress by the tensioned chain 160 and the mounting straps 120.

FIG. 5A illustrates a schematic side view of the camera system housing with camera carriage assembly partially slid out of the housing. In one example, camera housing is a sealable housing. In one example, camera housing 500 is composed of four-inch (4") diameter PVC pipe. In another example, camera housing 500 is composed of ABS, polycarbonate, or similar plastic tubing. In one example, camera housing 500 provides means for resisting at least one-half atmosphere of pressure difference between the inside and the outside of the closed housing. The water proof, flood proof and wind proof casing with vibratory protection protects the rest of the device from severe winds and submersion in surge or flood.

A lens holder 520 is disposed on one end of camera housing 500, the front side of this casing. In one example, lens holder 520 is plastic, slightly convex outward in curvature, with an orifice to receive an optical window, clear plastic lens 522 (shown in FIG. 9). Lens holder 520 provides a means for a camera to view from the inside of the camera housing 500. In one example, a hood is formed on the end of camera housing 500 above lens holder 520 for rain protection.

A sealing cap 590 is disposable on the other end of camera housing 500, the sealing cap removable to receive the guided slide inside the housing. In one example, cap 590 includes threads 591 which conform to receiving threads 592 in the end of camera housing 500. In one example, camera housing 590 includes a threaded PVC casing seal and cap 590 is a threaded PVC access plate. In another example, a pressure seal with O-ring or gasket is used. In one example, cap 590 provides a means for sealing camera housing 500 without disturbing the final deployed positioning and alignment of the camera system 300.

Figure 5C:
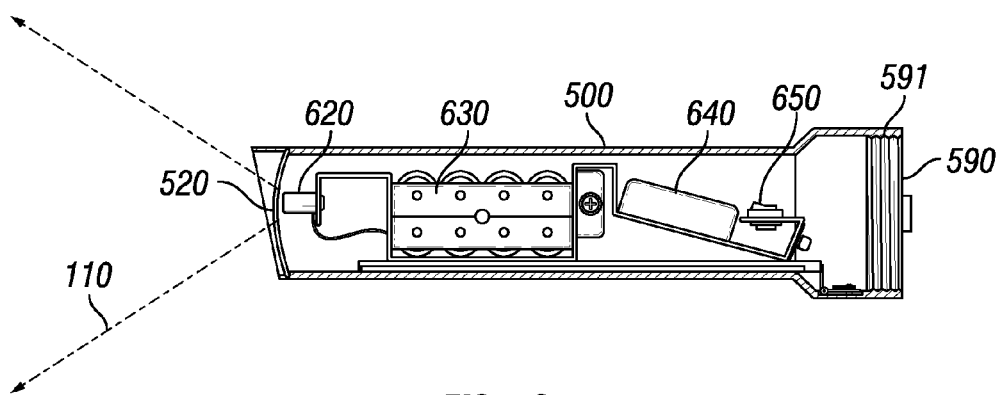
FIG. 5C illustrates a schematic side view of the camera system housing with camera carriage assembly inserted into the housing, and sealed with a cap.
Figure 6:
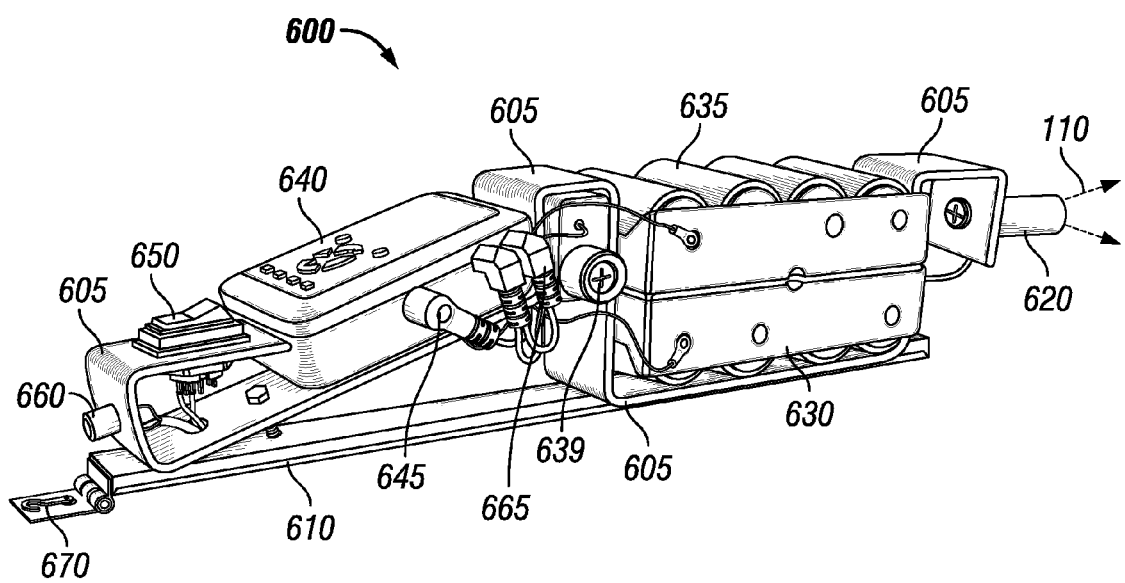
FIG. 6 illustrates a perspective view of the camera carriage assembly on the carriage track, removed from the camera system housing.

A camera carriage assembly 600, which will be detailed in FIG. 6, contains the camera, power, and recording electronics for collection of images. In the example of FIG. 5A, camera carriage assembly 600 is shown partially inserted into camera housing 500. Camera 620 is disposed at one end of camera carriage assembly 600 and is positioned and arranged to be able to capture images through the opening of lens holder 520 that is disposed on one end of camera housing 500. Camera 620 is mounted on one end of a variously bended frame, shown as guided slide frame 605. Frame 605 provides a means for carrying components. A power storage container, battery container 630 is mounted on guided slide frame 605.

In one example, battery container 630 is mounted on guided slide frame 605 adjacent to camera 620. A digital video recording device, digital video recorder 640 is mounted on guided slide frame 605, in one preferred example, adjacent to battery container 630 and on the other side of battery container 630 from camera 620. In one example, a master power switch 650 is mounted on guided slide frame 605, on the end opposite from the end holding camera 620. In one example, camera 620, battery container 630, digital video recorder 640, and master power switch 650 are all mounted longitudinally along one side of guided slide frame 605. The other side of guided slide frame 605 is then mounted or otherwise affixed to a guided slide 610. Battery container 630 and digital video recorder 640 are thereby disposed on guided slide 610 by way of guided slide frame 605.

In one example, camera 620 is a low-lux video camera without infrared enhancement. In one example, camera 620 includes a fixed-focus lens. In one example, camera 620 includes a locking-adjustable-focus lens. In one example, camera 620 includes a low-lux night-vision camera without infrared enhancement. In one example, camera 620 is a combination of a low-lux camera and a night-vision camera without infrared enhancement. The night-vision camera provides images when the light level is too low for the low-lux camera. In one example, camera 620 is non-motion sensing.

In one example, digital video recorder 640 has capacity to record digital images from camera 620 at a frame rate of at least one frame per second and has capacity to store at least two days accumulation of the recorded digital images when recorded at a frame rate of two frames per second.

In one example, power storage container, battery container 630 is physically dimensioned for holding a power storage member having capacity to provide power to the camera and the digital video recording device sufficient to capture and store at least two days accumulation of the recorded digital images when recorded at a frame rate of two frames per second. In one example, battery container 630 is physically dimensioned to contain eight type D batteries. In one example, battery container 630 is physically dimensioned to contain at least one battery selected from the group consisting of: US ANSI Standard C18.1 type 13 batteries, type D batteries, rechargeable US ANSI Standard C18.1 type 13 batteries, and rechargeable type D batteries. In one example, battery container 630 is physically dimensioned to contain at least eight batteries selected from the group consisting of: US ANSI Standard C18.1 type 13 batteries, type D batteries, rechargeable US ANSI Standard C18.1 type 13 batteries, and rechargeable type D batteries.

A receiving track 510 for receiving guided slide 610 is disposed longitudinally in the interior of camera housing 500. Guided slide 610 slides in and out of camera housing 500, riding on receiving track 510 and transporting guided slide frame 605 and its carried components (camera carriage assembly 600) in and out of camera housing 500.

In one example, a latch 670 is disposed on the end of guided slide 610 for securing camera carriage assembly 600 within camera housing 500.

In one example, camera housing is a sealable housing having a means for positioning and locking the guided slide inside the housing. In one example, receiving track 510 and latch 670 provide means for positioning and locking the guided slide inside the housing. In one example, an internal mount is disposed in the housing for preventing rotation of the guided slide member and for preventing longitudinal movement of the guided slide member. In one example, a track disposed inside the housing prevents rotation of the guided slide member. A fastening member is disposed inside the housing for preventing longitudinal movement of the guided slide member. In one example, a stop member is disposed in the housing and configured to receive the guided slide member. The optical window and the camera are positioned and arranged for the camera to capture images through the optical window when the guided slide is received by the internal mount.

FIG. 5B illustrates a schematic side view of the camera system housing with camera carriage assembly inserted into the housing, with a detachable monitor connected. In one example, camera 620 is disposed at one end of camera carriage assembly 600 and is positioned and arranged to be able to capture images through the opening of lens holder 520 that is disposed on one end of camera housing 500. This enables the camera to capture images that are in the line of vision 110.

In one example, latch 670 is latched to camera housing 500, immobilizing carriage assembly 600 within the interior of camera housing 500.

A problem occurs due to the requirements for securing the camera system 300 in that it is not practical to aim the camera system at the target structure 100 while maintain ease of access to the components on camera carriage assembly 600 and insuring that the camera remains aimed at the target structure after the components on camera carriage assembly 600 have been inserted into camera housing 500. A means for aiming the camera is required. Since there is no opportunity to adjust the camera during the severe weather event, it is highly desirable and, in some cases, essential that there is absolute positive verification that the camera was properly aimed on-target at the time of initial deployment. Further, there is a need to prove that the deploying technician properly deployed the camera system 300 and did not make a mistake and was not careless in performing the deployment task.

In one example, absolute positive aiming verification is performed by monitoring the actual video images being captured by the camera. These means for absolutely verifying the captured camera images solves a number of problems, including verification that all the components of the deployed camera system 300 are working at the time of deployment. Another problem solved is that manual sighting is avoided, which provided no positive recorded verification of proper deployment and only infers, but does not confirm, that the camera is properly aligned and aimed at the target. In one example, a video screen is disposed into the camera housing 500 or onto the carriage assembly 600. A video screen produces additional footprint, taking into consideration wind load and power requirements, and in at least one example, its integration into or onto the camera carriage assembly 600 is not fully desired. In a preferred example, a detachable monitor screen 690 removably plugs into the carriage assembly 600 (video output outlet, video recorder output jack 660 shown in FIG. 6), to monitor and view the images being captured by camera 620 and recorded by digital video recorder 640. In one example, detachable monitor remains outside of housing 500 and is hand-held for ease in viewing during the adjustment process. In this way, adjustments to the mounting of camera housing 500 and/or mounting plate 400 may be made during deployment and prior to locking camera system 300 in final, fixed position. Further, any other imaging problems are detectable prior to finalizing deployment of the camera system. For example, if camera 620 for some reason is not properly inserted to view through lens holder 520, or if there is debris or condensation obscuring vision, then these issues may be identified and resolved in the field. Therefore, in one example, a means for aiming is provided by having a video output outlet disposed in the housing, with the video output outlet in video communication with the digital video recording device, positioned and arranged to connect to a detachable monitor screen when the sealing cap is detached from the housing and the guided slide is received by the internal mount. The detachable monitor screen is external to the housing, and removably connects to the video output outlet when the sealing cap is detached from the housing and the guided slide is received by the internal mount.

In one example, a location tracking device 700 is disposed in camera housing 500. In one example, tracking device 700 is disposed on frame 605, underneath digital video recorder 640. In one example, tracking device 700 is disposed on guided slide 610, underneath digital video recorder 640. In one example, location tracking device 700 is a self-powered remote tracking device. In one example, tracking device 700 maintains a power source that is independent of the power for camera 620 and digital video recorder 640. In one example, remote tracking device 700 is a GPS internet broadcasted tracking device. In one example, remote tracking device 700 is a beacon. In one example, remote tracking device 700 is a radio beacon. Remote tracking device 700 provides a means for retrieval of camera system 300 in the event anchorage of camera system 300 fails or camera system 300 is otherwise dislocated.

FIG. 5C illustrates a schematic side view of the camera system housing with camera carriage assembly inserted into the housing, and sealed with a cap. This configuration presumes that camera housing 500 and mounting plate 400 are acceptably aimed at the target structure and that the umbilical to the detachable monitor screen is no longer required. In one example, detachable monitor screen 690 is unplugged and connection removed from carriage assembly 600. Cap 590, with threads 591, is disposed onto the threaded end 592 of camera housing 500, sealing camera carriage assembly 600 inside camera housing 500. Camera system 300 is now configured to collect images in the line of vision 110. The camera and digital video recording device are configured to run autonomously upon sealing inside the housing.

In many examples, there is no power or wireless signal available for remote monitoring during storms. In one example, camera system 300 is self contained and powered internally. The battery power case is contained with the camera in the waterproof and windproof enclosure. In one example, the camera system 300 continues to operate for days after the storm before it powers down.

In many examples, infrared cameras and motion sensor cameras will not work because of rain interference. In one example, camera system 300 has no infrared lighting or motion sensors.

FIG. 6 illustrates a perspective view of an example of the camera carriage assembly on the carriage track, removed from the camera system housing. In one example, camera 620, battery container 630, power fuse 639, digital video recorder 640, master power switch 650, and digital video recorder output jack 660 are all mounted sequentially and longitudinally along the top side of guided slide frame 605. The bottom side of guided slide frame 605 is then mounted or otherwise affixed to a guided slide 610. A latch 670 is disposed on the digital video recorder output jack 660 end of guided slide 610 for securing camera carriage assembly 600 within camera housing 500.

Electrically and for video communication, camera 605 is connected to digital video recorder 640 by way of DVR video input plug 665. Power is obtained from batteries 635, stored in battery container 630. In one example, power storage container, battery container 630 is in electrical supply communication with the camera and the digital video recording device. The power from batteries 635 is fused by power fuse 639 and switched by master power switch 650. In one example, master power switch 650 is disposed near the rear end of carriage assembly 600 so that it may be accessed by hand while the carriage assembly is fully inserted into camera housing 500. The switched and fuse protected power is fed to digital video recorder 640 by way of DVR power in plug 645. Digital video recorder output jack 660 is extended on frame 605 to the rear end of carriage assembly 600 so that it may be easily accessed for plugging in monitor screen 690 while the carriage assembly is fully inserted into camera housing 500.

To meet the performance requirements of an extended monitoring period during a severe weather event, the various components must be matched and balanced against one another in terms of space and power management. One preferred example of these performance pairings is provided.

In one preferred example, camera 620 is a super low light black and white camera using a super HAD CCD that delivers 420 lines resolution with 0.0003 lux, using a 3.6 mm lens with 92 degree field of view ("FOV") and having an electronic shutter speed variable from $\frac{1}{60}$ to $\frac{1}{100,000}$ second. In one example, a zero lux to near zero lux digital camera is preferred to avoid use of non-passive supplemental infrared light sources. Zero lux to near zero lux digital cameras provide images day or night and/or in rain, enabling a supply of images of the damage sequence and documentation of the cause of damage to be recordable. In one example, camera 620 is model PC88WR-2, made by Sony Corporation.

In one example, digital video recorder 640 is small enough to fit in camera housing 500. In one example, digital video recorder 640 provides means for recording of images on portable digital storage media. In one preferred example, digital video recorder 640 is a micro DVR having the following specifications: SNTSC/PAL Video system with video loss protection, MGEG4-SP ASF file Format, from 1 to 30 frames per second selectable record frame rate; NTSC record frame rates up to 30 fps; PAL record frame rates up to 25 fps; record time variable according to the size of the SD storage card media (FAT 16/32); operable from an external power source of DC 12 Volts 410 mA with internal backup 2-AA battery power in addition to external DC power input; weight of 89 grams; dimensions of 65 mm by 90 mm by 29 mm; and operational in humidity of 30 to 80% and temperatures of 41 to 113 degrees Fahrenheit. In one example, digital video recorder 640 is a "SECUMATE" mini-portable security recorder, model number MDVR-14, marketed by SecuMate Europe BV of Scholeksterstraat 41, 4330 AD Middelburg, The Netherlands. In one example, digital video recorder 640 records digital data on a removable digital storage media. In a preferred mode of operation, digital video recorder 640 is set to collect two frames per second for at least two days. In one example, images from the media are used to document and report, in detail, the cause and sequence of damage to property. In one example, vandalism is also recorded and may be used for law enforcement.

In one preferred example, standard "off-the-shelf" battery power is desired. The reason for this is that time is limited to deploy a camera system during a severe weather event and if a failure occurs in the field, it is important that the deployers have the option of finding fresh batteries at a local consumers-based store. In one example, for batteries 635, eight "D" cell batteries have adequately small physical footprint, are readily obtained in a consumer-based store, and provide the milliamp hours required for the duration of the severe weather event.

Figure 7:
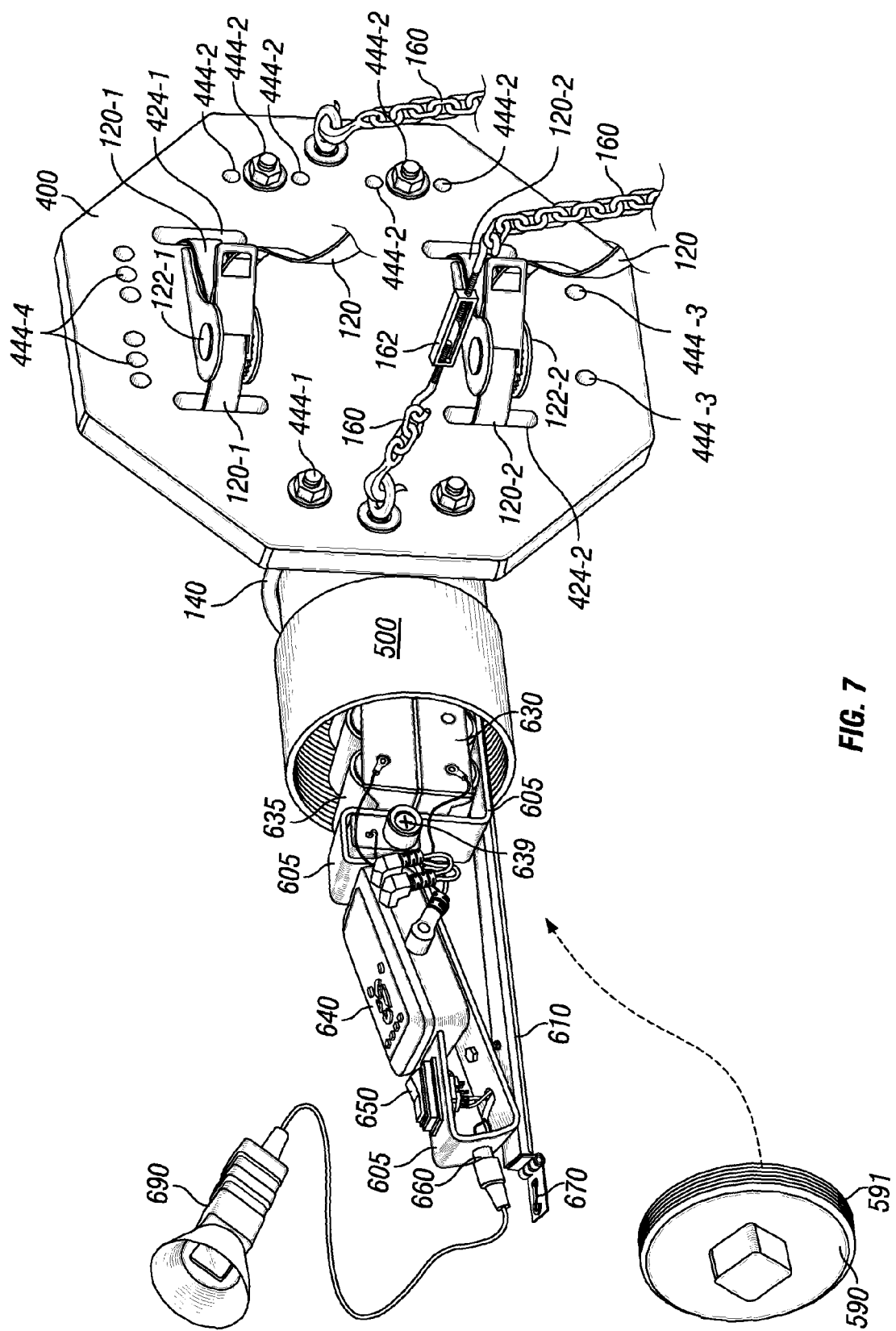
FIG. 7 illustrates a perspective view of the camera carriage assembly partially inserted into the camera system housing, attached to the mounting plate.

FIG. 7 illustrates a perspective view of the camera carriage assembly partially inserted into the camera system housing, attached to the mounting plate.

In one example, mounting straps 120-1, 120-2 provide a minimum of 600 pounds working load for each of the ratchets 122-1, 122-2. In one example. mounting straps 120-1, 120-2 are a minimum width of 1.25 inches each. In one preferred example, mounting straps 120-1, 120-2 are composed of nylon mesh, have a webbing thickness of three millimeters (3 mm), have a webbing width of 1.25 inches (1.25"), exhibit a breaking strength of 1800 pounds, include a ratchet style fastener (122-1, 122-2), weigh 3.2 pounds, have a strap length of eight feet (8'), are UV protected, weather resistant. In one example, each of ratchets 122-1, 122-2 have an assembled depth is three inches (3"), an assembled height is 9.25 inches (9.25"), and an assembled width is six inches (6"). In one example, each of ratchets 122-1, 122-2 is coated for corrosion resistance. In one example, each of ratchets 122-1, 122-2 is a buckle-type tie-down strap.

In one example, U-bolts 140 are comprised of zinc-plated steel. In one example, U-bolts 140 are dimensioned to ½-13× 4½"×6½".

In one example, detachable monitor screen 690 is a black and white test monitor powered by three "AA" batteries having a standard RCA input jack adaptable to RCA or standard 3 mm inputs from DVR output, and having a rubber eye seal and manual focusing adjustment. The focusing and adjustment monitor provides a visual means of adjusting the setup at the remote location.

In one example, for stabilizing chain 160, eyelets are bolted into the pair of third receptacle orifices 464 of mounting plate 400, the eyelets protruding on the back side of mounting plate 400 (the U-bolts 140 and camera housing 500 disposed on the front side of mounting plate 400). Stabilizing chain 160 further comprises hooks on the ends of the chain that are receivable by the eyelets. A means for tensioning is provided, as a hooked stainless steel turnbuckle 162 of hook-and-eye design is disposed within the chain. Therefore, in one example, the stabilizer chain is arranged and configured for receiving by the pair of third receptacle orifices, with one end of the chain is bolted to the mounting plate at a first of the pair of the third receptacle orifices and the other end of the chain mounted to one end of a tensioner wherein the other end of the tensioner is attachable to the second of the pair of third receptacle orifices.

Figure 8:
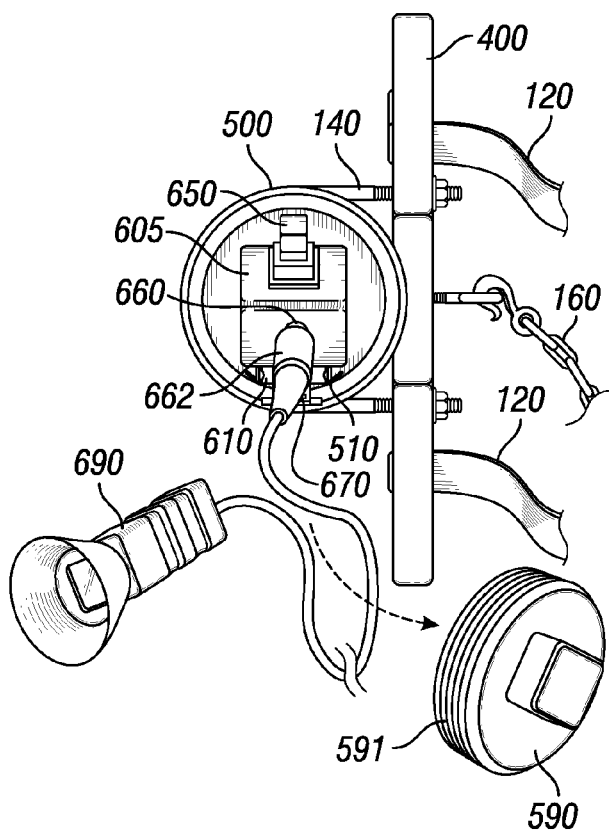
FIG. 8 illustrates an end-on view of the camera carriage assembly fully inserted into the camera system housing, attached to the mounting plate.

FIG. 8 illustrates an end-on view of the camera carriage assembly fully inserted into the camera system housing, attached to the mounting plate. From the cap-end view of camera housing 500, frame 605 of carriage assembly is visible, along with master switch 650 and plug 662 (plugged into obscured video recorder output jack 660). Plug 662 provides a video connection to detachable monitor screen 690. Master switch 650 and video recorder output jack 660 are positioned and arranged for easy hand-accessibility while cap 590 is removed from camera housing 500. Cap 590 is attachable to the end of camera housing 500 upon disengagement of monitor screen 690 and plug 662 from the carriage assembly 600. Rear U-bolt 140 wraps around camera housing 500, affixing it to mounting plate 400. Camera housing 500 and U-bolts 140 are disposed on the front side of mounting plate 400. Straps 120 and chain 160 are disposed on the back side of mounting plate 400.

Figure 9:
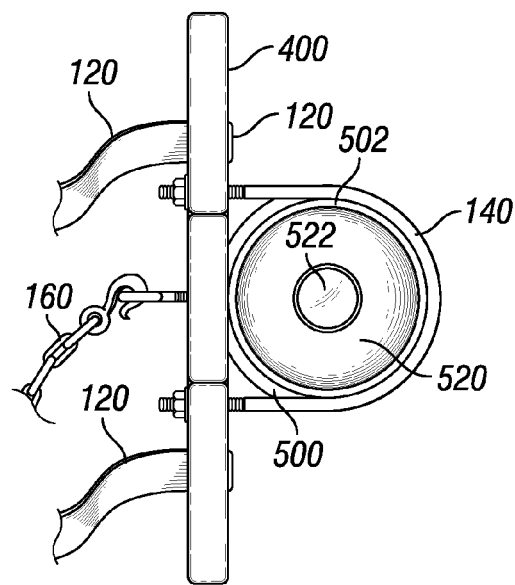
FIG. 9 illustrates an opposite end-on view of the camera system housing showing the casing lens of the camera system housing, attached to the mounting plate.

FIG. 9 illustrates an opposite end-on view of the camera system housing showing the casing lens of the camera system housing, attached to the mounting plate. From the lens-end view of camera housing 500, front U-bolt 140 wraps around camera housing 500, affixing it to mounting plate 400. As previously described, front U-bolt 140 may be bolted into one pair of a plurality of pairs of holes in mounting plate 400, the plurality of second pairs of second receptacle orifices 444-2 or 444-4. This enables camera housing 500 to be tilted up or down from horizontal so that the camera can be aimed to the target structure.

Lens holder 520 is disposed on one end of camera housing 500, the front side of this casing. In one example, lens holder 520 is plastic, slightly convex outward in curvature, with an orifice to receive a clear plastic lens 522. In one example, rainwater accumulation on lens 522 interfered with quality videos. Lens holder 520 and lens 522 are recessed within camera casing 500, keeping the view clear. In one example, camera casing 500 provides a hooded overhang and lens 522 is coated with a dispersant that keeps the view clear of rain.

Camera 520 captures images through the lens aperture of lens 522. Camera housing 500 and U-bolts 140 are disposed on the front side of mounting plate 400. Straps 120 and chain 160 are disposed on the back side of mounting plate 400.

In one example, the storm camera system 300 includes: means for capturing images in near zero lux light conditions; means for remotely powering the imaging system components; means for digitally recording the captured images, means for storing the recorded images onto portable digital storage media, and a means for monitoring the captured images, the means for monitoring being capable of aiming and adjustment; means for adjusting the mounting of the system that is water proof and surge proof, means for encasing the imaging system components that is water proof and wind proof and provides vibratory protection, and means for tracking for remote location of the system.

In an example of operation of the storm camera system 300, the camera systems are deployed at multiple sites that are subject to the projected severe storm or hurricane path. Mounting plate 400 is secured to a mounting structure, using the adjustable anchorage of straps 120 and stabilizing chain 160. The camera system 300 is aimed at a target structure. Detachable monitor screen 690 is plugged into video output jack 660 of carriage assembly 600. The capture rate of the digital video recorder 640 is set. In one example, the capture rate is set to one frame per second. The camera carriage assembly is inserted into camera housing 500 and locked into place using latch 670. The field of view and focus of camera 620 is adjusted, using detachable monitor screen 690 to monitor the video being captured. A tracking device 700 is turned on. Cap 590 is attached to camera housing 500, sealing the carriage assembly 600 in camera housing 500. After the storm event, camera system 300 is retrieved from the mounting structure. If the camera system is no longer attached to the mounting structure, for example, in the case of destruction of the mounting structure, tracking device 700 is used to locate camera system 300. Mounting plate 400 of camera system 300 provides net buoyancy to camera system 300, facilitating location and retrieval of camera system 300. Once retrieved, cap 590 is removed and carriage 600 slide out from camera housing 500. The portable storage media is removed from digital video recorder 640 and the images recorded thereon are downloaded for viewing. The recorded images provide a detailed time-sequenced documentation of the cause of damage to the target structure as well as the sequence of the damage. From the recorded images, a detailed technical report of damage extent and damage sequence is prepared. Recorded images of vandalism are also available for reporting. Since the time-sequence of images provide precise and absolute identification of the cause and timing of structural damage, quantitative assessment of storm surge versus wind damage can be made.

The cooperative nature of the various structural elements of the camera system 300 can be illustrated in the following examples.

In one example, storm surge removes remote devices and the video record cannot be recovered. Camera system 300 floats and tracking device 700 allows recovery after the storm recedes and access is allowed into the storm-devastated area. The housing 500 and buoyant mounting plate 400 float and serves to keep the system above debris if the storm surge removes the fastening point. The tracking device 700 allows remote recovery days or weeks after the event. The portable digital media card is durable to moisture and vibration, allowing retrieval of the data.

In one example, camera system 300 is set and cased with a final view of the subject property to insure alignment. System 300 is equipped with a removable focus and view screen 690 and with an internal receiving track 510 that insures alignment while accessing and reinserting the camera carriage assembly 600 into the camera housing 500 before final seal. The track is securely mounted to the interior of the housing, allowing access of the whole camera assembly to replace batteries, set focus, set video recorder and check field of view just before sealing the housing. The camera system 300 maintains alignment when the camera carriage assembly 600 is reinserted and does not become misaligned during high winds. The focus port or screen, detachable monitor screen 690 is removable so it can be used on multiple locations just before each camera housing 500 is sealed.

In one example, energy requirements limit the run-time of fully remote cameras when batteries are contained within the system. This prevents deployment in multiple areas with enough time to record the entire storm event. In one example, camera system 300 provides 48 to 72 hours of run-time with normal batteries that fit inside the casing. Camera system 300 utilizes off the shelf batteries that can be easily changed in-the-field, as needed. In one example, the run-time has been optimized by pairing compatible camera and recorder with minimal energy requirements.

In one example, reliable evidence of damage from vandalism just after the storm is not possible because areas are vacated and power is off. Camera system 300 is self-contained and powered to record damage both during and after the storm event. Applicant found this to be an unexpected benefit of camera system 300.

Applicant states that the invention was conceived with knowledge of the specific use, client needs and application of theory. With the intended end use in mind, the elements were located and assembled element by element. Implementation of the theory required assembly trial and error, bench scale testing, prototype development and final full scale deployment and retrieval.

The foregoing disclosure is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant in the art having the benefit of the present disclosure. Further, the embodiments described are also intended to explain the best mode for carrying out the invention, and to enable others skilled in the art to utilize the invention and such or other embodiments and with various modifications required by the particular applications or uses of the invention. It is intended that the claims based on this disclosure be construed to include alternative embodiments to the extent that is permitted by prior art.

The invention claimed is:

1. A storm damage monitoring system, comprising:
   a guided slide having means for carrying components;
   a low-lux video camera disposed on the guided slide;
   a digital video recording device disposed on the guided slide and connected to the video camera, having capacity to record digital images from the camera at a frame rate of at least one frame per second and having capacity to store at least two days accumulation of the recorded digital images when recorded at a frame rate of two frames per second;
   a power storage container disposed on the guided slide and in electrical supply communication with the camera and the digital video recording device, physically dimensioned for holding a power storage member having capacity to provide power to the camera and the digital video recording device sufficient to capture and store at least two days accumulation of the recorded digital images when recorded at a frame rate of two frames per second;
   a sealable housing having a means for positioning and locking the guided slide inside the housing;
   an optical window on one side of the housing;
   a sealing cap disposable on an opposite side of the housing, the sealing cap removable to receive the guided slide inside the housing;
   wherein the optical window and the camera are positioned and arranged for the camera to capture images through the optical window when the guided slide is received by the sealable housing;
   means for aiming the camera, the aiming means comprising:
      a video output outlet disposed in the housing, the video output outlet in video communication with the digital video recording device, positioned and arranged to connect to a detachable monitor screen when the sealing cap is detached from the housing and the guided slide is received by the sealable housing; and
      a detachable monitor screen external to the housing, removably connectable to the video output outlet when the sealing cap is detached from the housing and the guided slide is received by the sealable housing;
   a mounting plate;
   a first pair of first receptacle orifices disposed on the mounting plate positioned and arranged to receive a first anchoring strap, the first pair of first receptacle orifices positioned laterally on one side of a first axis of the mounting plate;
   a second pair of first receptacle orifices disposed on the mounting plate positioned and arranged to receive a second anchoring strap, the second pair of first receptacle orifices positioned laterally on the side of the first axis of the first mounting plate opposing the first pair of first receptacle orifices;
   a first and a second anchoring strap each arranged and configured for receiving by either the first pair or by the second pair of first receptacle orifices;
   a first pair of second receptacle orifices disposed on the mounting plate positioned and arranged to receive a first U-bolt for securing the housing to the mounting plate, the first pair of second receptacle orifices positioned laterally on one side of a second axis of the mounting plate;
   a plurality of second pairs of second receptacle orifices disposed on the mounting plate positioned and arranged to receive a second U-bolt for securing the housing to the mounting plate, the plurality of second pairs of second receptacle orifices positioned laterally on the side of the second axis of the mounting plate opposing the first pair of second receptacle orifices;

a third pair of second receptacle orifices disposed on the mounting plate positioned and arranged to receive a first U-bolt for securing the housing to the mounting plate, the third pair of second receptacle orifices positioned laterally on one side of the first axis of the mounting plate, the second axis opposing the first axis of the mounting plate;

a plurality of fourth pairs of second receptacle orifices disposed on the mounting plate positioned and arranged to receive a second U-bolt for securing the housing to the mounting plate, the plurality of fourth pairs of second receptacle orifices positioned laterally on the side of the first axis of the mounting plate opposing the third pair of second receptacle orifices;

a first and a second U-bolt for securing the sealable housing to the mounting plate, each of first and second U-bolt arranged and configured for receiving by either the first pair or by one of the plurality of second pairs of second receptacle orifices or by either the third pair or by one of the plurality of fourth pairs of second receptacle orifices;

a pair of third receptacle orifices disposed on the first axis of the mounting plate positioned and arranged to receive a stabilizer chain;

a stabilizer chain arranged and configured for receiving by the pair of third receptacle orifices, one end of the chain bolted to the mounting plate at a first of the pair of the third receptacle orifices and the other end of the chain mounted to one end of a tensioner wherein the other end of the tensioner is attachable to the second of the pair of third receptacle orifices; and a location tracking device disposed in the housing; and wherein the camera and digital video recording device are configured to run autonomously upon sealing inside the housing.

2. The system of claim 1 wherein the camera comprises a fixed-focused lens or locking-adjustable-focus lens.

3. The system of claim 1 wherein the camera comprises a low-lux video camera without infrared enhancement.

4. The system of claim 1 wherein the camera comprises a combination of a low-lux camera and a night-vision camera without infrared enhancement and wherein the night-vision camera provides images when the light level is too low for the low-lux camera.

5. The system of claim 1 wherein the camera is non-motion sensing.

6. The system of claim 1 wherein the power storage container is physically dimensioned to contain eight batteries selected from the group consisting of: US ANSI Standard C18.1 type 13 batteries, type D batteries, rechargeable US ANSI Standard C18.1 type 13 batteries, and rechargeable type D batteries.

7. The system of claim 1 wherein the location tracking device is powered by a second power storage member that is independent from the power storage container.

8. The system of claim 1 wherein the means for positioning and locking comprises an internal mount for preventing rotation of the guided slide member and for preventing longitudinal movement of the guided slide member.

9. The system of claim 1 wherein the means for positioning and locking comprises a track preventing rotation of the guided slide member and a fastening member for preventing longitudinal movement of the guided slide member.

10. The system of claim 1 wherein the means for positioning and locking comprises a stop member configured to receive the guided slide member.

* * * * *